(12) United States Patent
Matthiesen et al.

(10) Patent No.: US 9,925,710 B2
(45) Date of Patent: Mar. 27, 2018

(54) METHOD FOR THE PRODUCTION OF POUCHES, AND BLOW-MOLDED POUCH

(75) Inventors: Martin Matthiesen, Hamburg (DE); Uwe Dreher, Schwarzenbek (DE); Matthias Gernhuber, Hamburg (DE)

(73) Assignee: KHS CORPOPLAST GMBH, Hamburg (DE)

( * ) Notice: Subject to any disclaimer, the term of this patent is extended or adjusted under 35 U.S.C. 154(b) by 1359 days.

(21) Appl. No.: 12/452,870

(22) PCT Filed: Jul. 8, 2008

(86) PCT No.: PCT/DE2008/001135
§ 371 (c)(1),
(2), (4) Date: May 20, 2010

(87) PCT Pub. No.: WO2009/012749
PCT Pub. Date: Jan. 29, 2009

(65) Prior Publication Data
US 2010/0232732 A1 Sep. 16, 2010

(30) Foreign Application Priority Data
Jul. 25, 2007 (DE) .................. 10 2007 034 786

(51) Int. Cl.
*B65D 30/10* (2006.01)
*B29C 49/00* (2006.01)
(Continued)

(52) U.S. Cl.
CPC ...... *B29C 49/0073* (2013.01); *B29C 47/0026* (2013.01); *B29C 49/085* (2013.01); *B65D 1/02* (2013.01); *B65D 1/0276* (2013.01); *B65D 1/42* (2013.01); *B65D 79/005* (2013.01); *B29B 2911/1402* (2013.01); *B29B 2911/1404* (2013.01); *B29B 2911/14026* (2013.01); *B29B 2911/14033* (2013.01); *B29B 2911/14106* (2013.01); *B29B 2911/14133* (2013.01); *B29C 47/0054* (2013.01); *B29C 47/0057* (2013.01); *B29C 47/06* (2013.01); *B29C 49/06* (2013.01); *B29C 49/08* (2013.01); *B29C 49/12* (2013.01); *B29C 49/36* (2013.01);
(Continued)

(58) Field of Classification Search
None
See application file for complete search history.

(56) References Cited

U.S. PATENT DOCUMENTS 4,076,071 A 2/1978 Rosenkranz et al.
4,128,383 A 12/1978 Bond et al.
(Continued)

FOREIGN PATENT DOCUMENTS

DE 23 52 926 4/1975
DE 2352926 A1 4/1975
(Continued)

*Primary Examiner* — Monica Huson
(74) *Attorney, Agent, or Firm* — Lucas & Mercanti, LLP; Klaus P. Stoffel

(57) ABSTRACT

The pouch has a sealable mouth section, a side wall, and a sealed base. The material in the region of the side wall is oriented biaxially via blow molding of an injection-molded preform, and has an average wall thickness of at most 0.2 mm. The shape of the sealed base is intended to permit the article to stand upright without support.

12 Claims, 6 Drawing Sheets

(51) Int. Cl.
    *B29C 47/00* (2006.01)
    *B65D 1/02* (2006.01)
    *B65D 1/42* (2006.01)
    *B65D 79/00* (2006.01)
    *B29C 47/06* (2006.01)
    *B29C 49/06* (2006.01)
    *B29C 49/08* (2006.01)
    *B29C 49/12* (2006.01)
    *B29C 49/36* (2006.01)
    *B29C 49/42* (2006.01)
    *B29C 49/64* (2006.01)
    *B29K 67/00* (2006.01)
    *B29L 23/20* (2006.01)
    *B29L 31/00* (2006.01)

(52) U.S. Cl.
    CPC ...... *B29C 49/4205* (2013.01); *B29C 49/6418* (2013.01); *B29K 2067/00* (2013.01); *B29L 2023/20* (2013.01); *B29L 2031/7158* (2013.01)

(56) References Cited

U.S. PATENT DOCUMENTS

| | | | | |
|---|---|---|---|---|
| 4,254,079 A | * | 3/1981 | Agrawal | 264/537 |
| 4,497,855 A | * | 2/1985 | Agrawal et al. | 428/36.92 |
| 5,346,386 A | | 9/1994 | Albrecht et al. | |
| 5,648,026 A | | 7/1997 | Weiss | |
| 6,065,624 A | * | 5/2000 | Steinke | 215/383 |
| 2009/0174124 A1 | * | 7/2009 | Maeda et al. | 264/532 |
| 2013/0213922 A1 | | 8/2013 | Gerard et al. | |

FOREIGN PATENT DOCUMENTS

| | | |
|---|---|---|
| DE | 30 00 785 | 10/1986 |
| DE | 42 12 583 | 10/1993 |
| DE | 4212583 A1 | 10/1993 |
| DE | 43 40 291 | 6/1995 |
| DE | 4340291 A | 6/1995 |
| DE | 199 06 438 | 8/2000 |
| DE | 19906438 A1 | 8/2000 |
| EP | 1 543 939 | 6/2005 |
| EP | 1543939 A2 | 6/2005 |
| EP | 1 974 891 | 10/2008 |
| EP | 2 080 605 | 7/2009 |
| JP | 07257534 | 10/1995 |
| JP | 2001122237 | 5/2001 |
| JP | 2003191319 | 7/2003 |
| JP | 2005067705 | 3/2005 |
| WO | 2004/092029 | 10/2004 |
| WO | 2004092029 A1 | 10/2004 |
| WO | 2006/055979 | 5/2006 |
| WO | 2006/118584 | 11/2006 |

* cited by examiner

METHOD FOR THE PRODUCTION OF POUCHES, AND BLOW-MOLDED POUCH

The invention relates to a method of manufacturing a pouch which has a closable opening section, inside wall and a closed bottom.

The invention also relates to a pouch which has a closable opening section, a side wall and a closable bottom.

Pouches of the above-described type are frequently used for packaging foodstuffs, particularly beverages. Such a pouch typically has a thin and flexible wall which makes it possible to adapt to changes in the contour of the packaged product. In particular, in the case of beverages packaged in such pouches, it is possible to transport and store these pouches while requiring significantly less space than would be possible in the case of bottles having stable contours. If pouches are stacked in boxes or similar configurations, the adaptation of the pouch to the respective contour is possible to carry out stacking with small intermediate space areas between the bottles.

Because of their relatively small wall thicknesses, the pouches are additionally inexpensive to manufacture and, after they have been used, produce only small amounts of waste.

The configuration of such pouches is described, for example, in WO 2004/092029. An explanation of pouches as inner containers of cardboard box packaging can be found in EP 1 543 939.

Pouches are frequently manufactured in such a way that a prefabricated opening piece is provided with a foil-like side wall and floor material. The connection to the opening piece as well as the manufacture of a closed container from the foil material usually is effected by welding processes.

In the case of blowing processes which are also already known for manufacturing pouches, containers are produced which, even if used as intended, have a low stability with respect to contour and, as a result, require some type of support. The support can be effected, for example, by placing the pouches into a cardboard packaging or by using separate support elements.

If the container is formed by blowing pressure influence, preforms of a thermoplastic material, for example, preforms of PET (Polyethyleneterphthalate), are supplied within a blowing machine to different processing stations. Typically, a blowing machine of this type has a heating device as well as a blowing device in whose areas the previously heated preform is expanded by biaxial orientation into a container. The expansion takes place by means of compressed air which is conducted into the preform which is to be expanded. The process-technical sequence of such an expansion of the preform is explained in German published application 43 40 291. The previously mentioned introduction of the pressurized gas also includes the introduction of compressed air into the developing container bladder as well as the compressed air introduction into the preform at the beginning of the blowing process.

The basic construction of a blow station for shaping containers is described in German application 42 12 583. Possibilities for heating the preforms are explained in German application 23 52 926.

Within the device for blow molding, the preforms as well as the blown containers can be transported by means of various manipulation devices. Particularly useful have been found to be transport mandrels which are placed on the preforms. However, the preforms can also be manipulated by means of other support devices. The use of gripping tongs for manipulating preforms and the use of spreading mandrels which can be inserted in an opening area of the preform, are also among the available constructions.

A manipulation of containers with the use of transfer wheels is described, for example, in German published application 199 06 438, wherein the transfer wheel is arranged between a blowing wheel and a discharge section.

The already explained manipulation of preforms takes place, for the one part, in the so-called two-stage methods, wherein the preforms are initially manufactured in an injection molding process, are subsequently subjected to intermediate storage and are only later conditioned with respect to their temperature, and are then blown up into a container. On the other hand, the so-called one-stage methods are used in which the preforms, directly after their manufacture by injection molding and after a sufficient solidification, are heated and subsequently blown up.

With respect to the blow stations used, various types are known. In blowing stations that are arranged n rotating support wheels, a book-like folding out of the supports is frequently seen. However, it is also possible to use supports which are movable relative to each other or can be guided in another manner. In stationary blow stations, which are particularly suitable for receiving several cavities for forming the containers, typically plates, which are arranged parallel to each other, are used as mold supports.

Before heating is carried out, the preforms are typically placed on transport mandrills which either transport the preform through the entire blowing machine or travel merely in the area of the heating device. In the case of a stationary heating of the preforms, wherein the openings of the preforms are oriented downwardly in a vertical direction, the preforms are usually placed on a sleeve-like support element of the transport mandrel. In the case of a suspended heating of the preforms, in which the preforms are oriented so that the openings are oriented upwardly and vertically, usually spreading mandrel are inserted into the openings of the preforms in order to clamp the preforms.

The manufacture of the pouch with additional sheathing elements for making available a sufficient stability of use increases the production costs and, after a pouch has been used, also increases the quantity of waste. Moreover, for example, in pouches which are placed in cardboard sleeves, the lateral deformability during a transport and storage is no longer available.

It is the object of the present invention to improve a method of the type described above in such a way that the use properties of the pouches are improved.

In accordance with the present invention, an injection-molded preform is heated and shaped by a blow molding process into a container in such a way that the material in the area of the side wall is biaxially oriented and is deformed with an average wall thickness of at most 0.2 mm, and the closed bottom is provided with a contour in such a way that the pouch has inherently stable properties. Another object of the present invention is to construct a pouch of the above-described type in such a way that it has improved properties of use.

In accordance with the present invention, this further object is met by orienting the material in the area of the sidewall by blow molding of an injection-molded preform biaxially and providing an average wall thickness of at most 0.2 mm, and by providing the closed bottom with a contour which ensures that the pouch has inherently stable properties.

Another object of the present invention is to construct a pouch of the above-described type in such a way that improved properties of use are provided.

In accordance with the present invention, the material in the area of the side wall is oriented by biaxially orienting an injection-molded preform and providing it with an average wall thickness of at most 0.2 mm and by providing the closed bottom with a contour for providing an inherently stable property of the closed bottom of the pouch.

The combination of the blow-technological manufacture of the pouch from an injection-molded preform, which dimensions the wall thickness as well as the contour of the closed bottom requires a high quality of use of the pouch manufactured in this manner. As a result, the pouch can be manufactured without a lateral welding seam; the pouch has a sufficient lateral deformability for supporting a compact storage and a compact transport, and the pouch can still be positioned, because of the appropriate bottom contour, in the area of sales locations or can be positioned free standing for use. A pouch with these properties could not be manufactured in the past and constitutes a significant improvement of the present container constructions.

The deformability can be further improved by shaping the pouch with an average wall thickness of at most 0.15 mm.

A typical dimension of the pouch is a volume of at least 1 liter.

A typical product configuration is defined by a volume increase of the pouch of at least 10% in relation to the initial volume when the pouch is being filled. The provision of small wall thicknesses is further reinforced by the fact that the pouch is shaped with a weight of at most 15 grams.

In particular, it is advantageous that a preform having a wall thickness of at most 2.5 mm is deformed by blow technology into the container.

The processing time of the blow technological manufacture can be shortened by making the pouch with a blow pressure of at most 20 bars.

The costs of carrying out the blowing procedure can be reduced by carrying out the blowing process with the use of a single supply pressure.

The stability of the pouch can be improved by shaping the bottom of the pouch with an internal curvature.

Moreover, the stability of the pouch is improved by forming the bottom of the pouch with a standing ring.

The high stability of the floor area can be reinforced by constructing the floor of the pouch with a plurality of standing rings with contour elements extending in the direction toward the floor center.

A stackability of pouches lying on the floor is reinforced by shaping the pouch with an oval basic contour as seen in a horizontal sectional plane.

Figure 1:
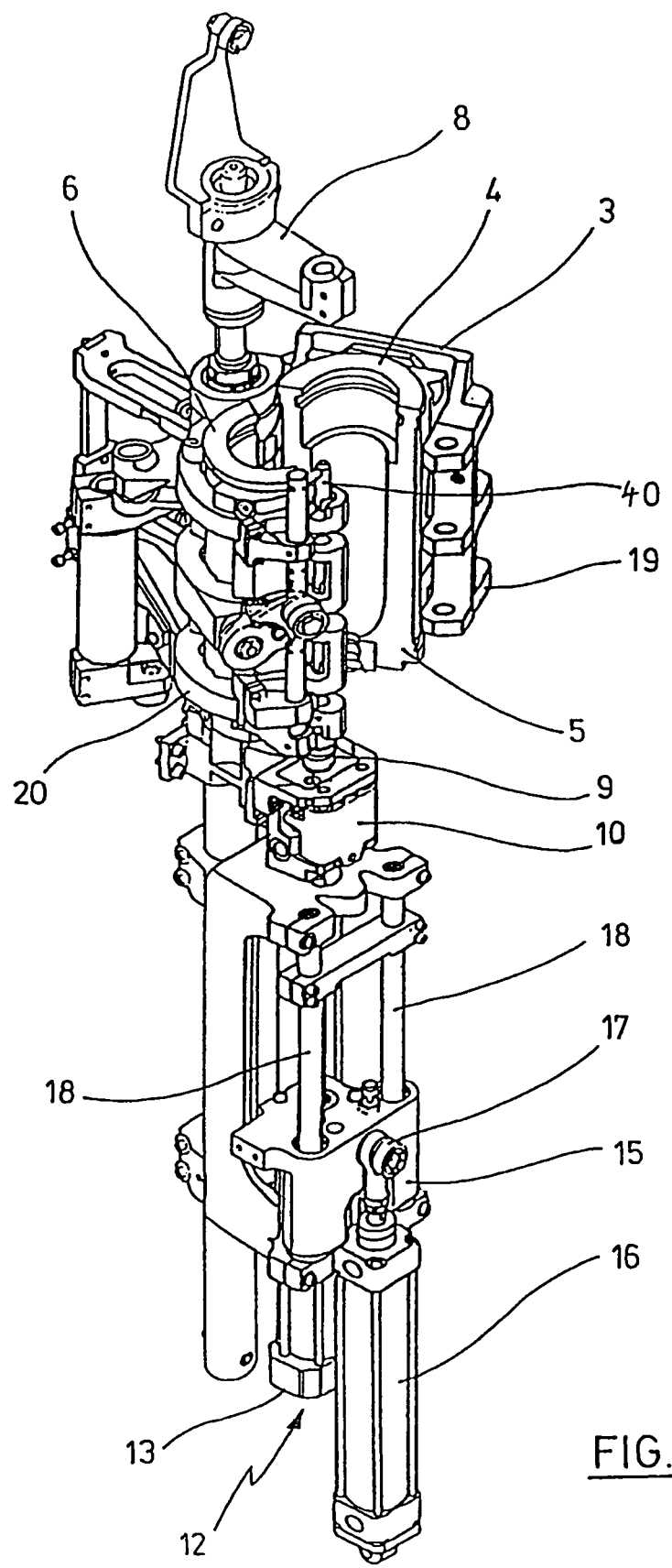
FIG. 1 is a perspective view of a blow station for manufacturing containers from preforms, in accordance with the present invention.
Figure 2:
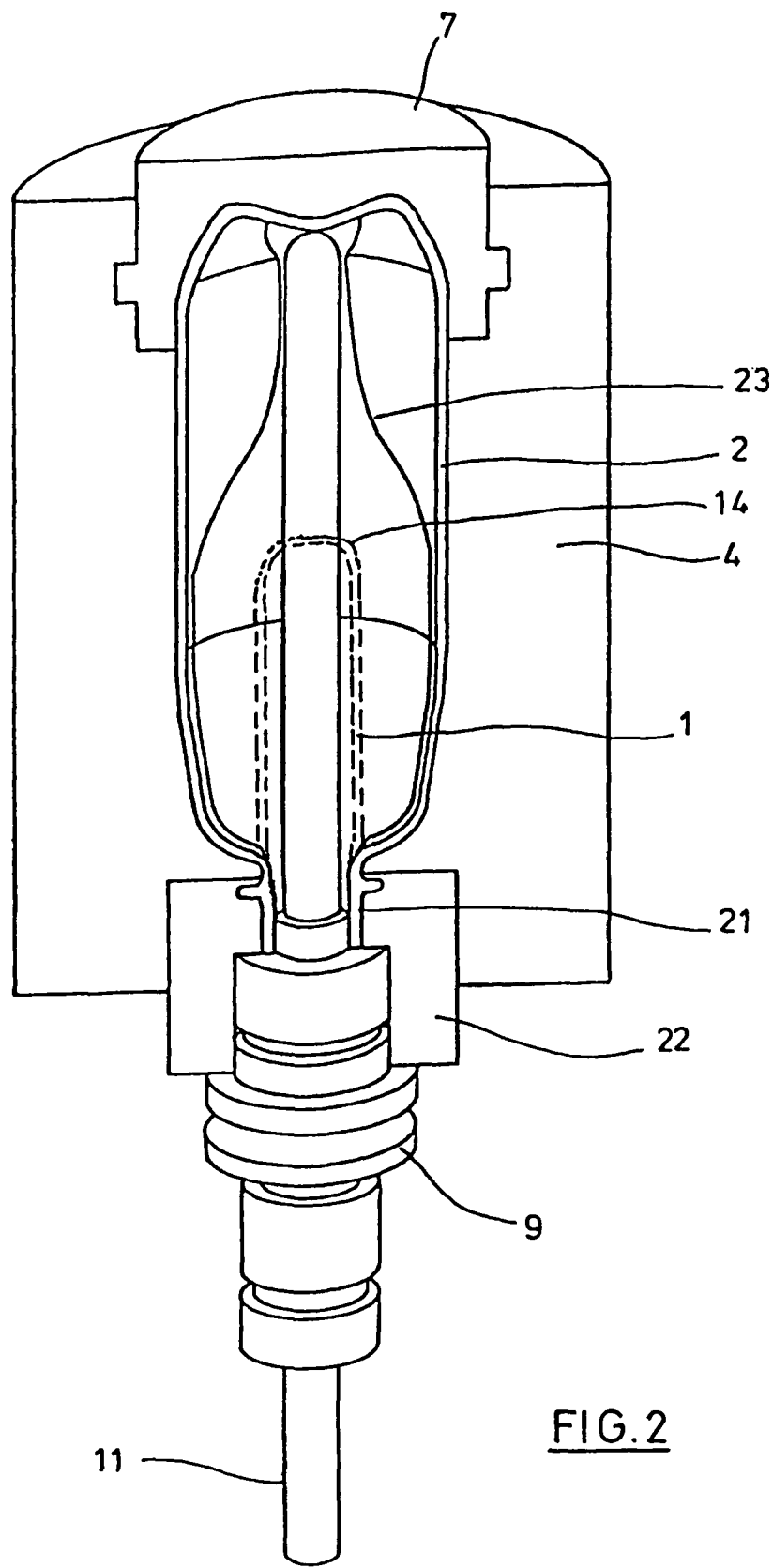
FIG. 2 is a longitudinal sectional view of a blow mold in which the preform is stretched and expanded.

The principal configuration of a device for deforming preforms 1 into containers 2 is illustrated in FIGS. 1 and 2.

The device for forming the container 2 is composed essentially of a blow station 3 which is equipped with a blow mold 4 in which a preform 4 can be placed. The preform 1 may be an injection-molded part of Polyethyleneterphthalate. In order to facilitate an insertion of the preform 1 into the blow mold 4 and for facilitating a removal of the finished container 2, the blow mold 4 is composed of mold halves 5, 6, and a bottom portion 7 which can be positioned by means of a lifting device 8. The preform 1 can be held in the area of the blow station 3 by transport mandrel 9 which, together with the preform 1, travels through a plurality of treatment stations within the device. However, it is also possible to insert the preform 1 directly, for example, by means of tongs or other manipulating means directly into the blow-mold floor.

In order to make a compressed air line possible, a connecting piston 10 is arranged underneath the transport mandrel 9 for supplying the preform 1 with compressed air while simultaneously carrying out a seal relative to the transport mandrel 9. However, in a modified construction it is basically also conceivable to use fixed compressed air lines.

In this embodiment, the preform 1 is stretched by means of a stretching rod 11 which is positioned by a cylinder 12. In accordance with another embodiment, a mechanical positioning of the stretching rod 11 is carried out by means of curved segments which are acted upon by gripping rollers. The use of curved segments is particularly advantageous in those cases when a plurality of blow stations 3 is arranged on a rotating blow wheel.

In the embodiment illustrated in FIG. 1, the stretching system is constructed in such a way that a tandem arrangement of two cylinders 12 is made available. A primary cylinder 13 moves the stretching rod 11 initially before the beginning of the actual stretching procedure into the area of a bottom 14 of the preform 1. During the actual stretching procedure, the primary cylinder 13 is positioned with the extended stretching rod 11 together with a carriage 15 which supports the primary cylinder 13 by means of a secondary cylinder 16 or through a curve control. In particular, it is being considered to use the secondary cylinder 16 in such a way by a curve control that a guide roller 17, which during the stretching procedure slides along a curved path, provides an actual stretching position. The guide roller 17 is pressed by the secondary cylinder 16 against the guide track. The carriage 15 slides along to guide elements 18.

After the mold halves 5, 6 arranged in the area of supports 19, 20 after closing, a locking of the supports 19, 20 takes place relative to each other by means of a locking device 20.

For adapting two different shapes of an opening section 21 of the preform 1, the use of separate threaded inserts 22 in the area of the blow mold 4 is provided as indicated in FIG. 2.

FIG. 2 additionally shows, in addition to the blown container 2, in broken lines, the preform 1 and schematically a container bladder 23 which is developing.

Figure 3:
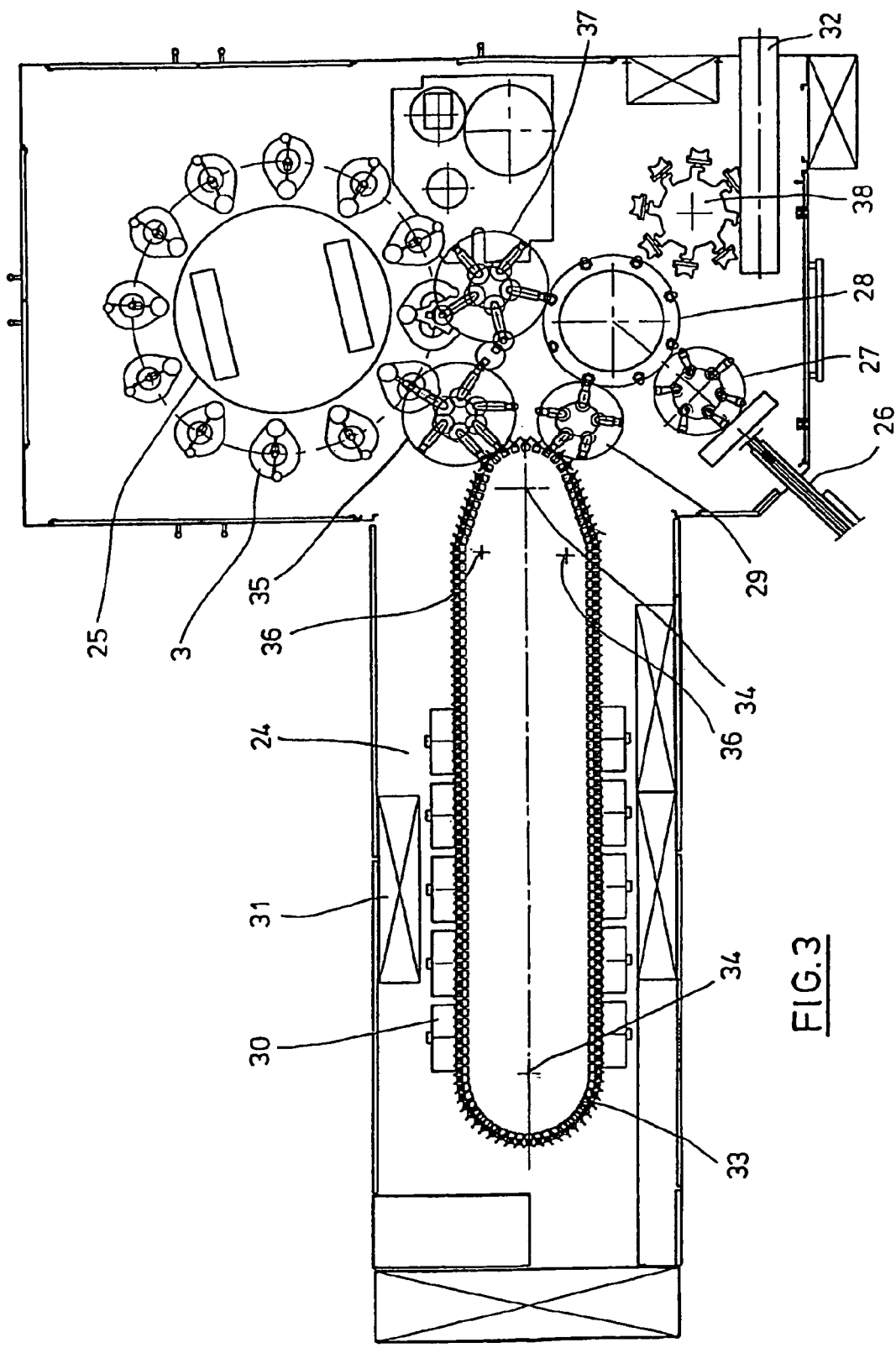
FIG. 3 is a sketch for demonstrating a basic construction of a device for blow molding containers.

FIG. 3 shows the basic configuration of a blow machine which is provided with a heating unit 24 as well as a rotating blow wheel 25. Starting from a preform insertion 26, the preforms 1 are transported by transfer wheels 27, 28, 29 into the area of the heating unit 24. Heating elements 30 as well as blowers 31 are arranged along the heating unit 24 for adjusting the temperature of the preforms 1. After the temperature of the preforms 1 has been sufficiently adjusted, the preforms 1 are transferred to the blow wheel 25 in whose area the blow stations 13 are arranged. The finished containers 2 are supplied by additional transfer wheels to a discharge unit 32.

In order to be able to deform a preform 1 in such a way to a container 2 that the container 2 has material properties which ensure a long life of the food stuffs filled into the containers 2, particularly of beverages, special process steps must be adhered to during the heating and aligning of the preforms 1. Moreover, advantageous effects can be achieved by adhering to special dimensioning rules.

Different synthetic materials can be used as thermoplastic material. It is possible to use, for example, PET, PEN, or PP.

The expansion of the preforms 1 during the orientation procedure takes place by compressed air supply. The compressed air supply is divided into a preblowing phase in which gas, for example, compressed air, is supplied at a low pressure level and a subsequent main blowing phase in which gas is supplied at a higher pressure level. During the preblowing phase, typically compressed air is used at a pressure interval of 10 bars to 25 bars and during the main blowing phase, compressed air having a pressure in the interval of 25 bars to 40 bars is supplied.

FIG. 3 also shows that in the illustrated embodiment a heating unit 24 is formed by a plurality of revolving transport elements 33 which are arranged in a row in a manner of a chain and are guided along by deflection wheels 34. It is particularly intended to place an essentially rectangular basic contour by the chain-like arrangement. In the illustrated embodiment, in the area of the extension of the heating section 24 facing the transfer wheel 29 and a feeding wheel 35, a single deflection wheel 34 having a relatively large dimension and in the area of adjacent deflections two deflection wheels 36 having relatively small dimensions are used. However, any other suitable guide means are conceivable.

In order to facilitate an arrangement of the transfer wheel 29 and the feeding wheel 35 relative to each other which is as tight as possible, the arrangement which is illustrated is particularly advantageous because in the area of the corresponding extension of the heating section 24, three deflection wheels 34, 36 are positioned, with the relatively smaller deflection wheels 36 in the area of the transfer to the linear extensions of the heating section 24 and the greater deflection wheel 34 in the immediate transfer area to the transfer wheel 29 and to the feeding wheel 35. As an alternative to using chain-like transporting elements 33, it is also possible, for example, to use a rotating heating wheel.

After the container 2 has been finished blow molded the container 2 is removed by a removal wheel 37 from the area of the blow stations 3 and is transported through the transfer wheel 28 and a delivery wheel 38 to the delivery section 32.

Figure 4:
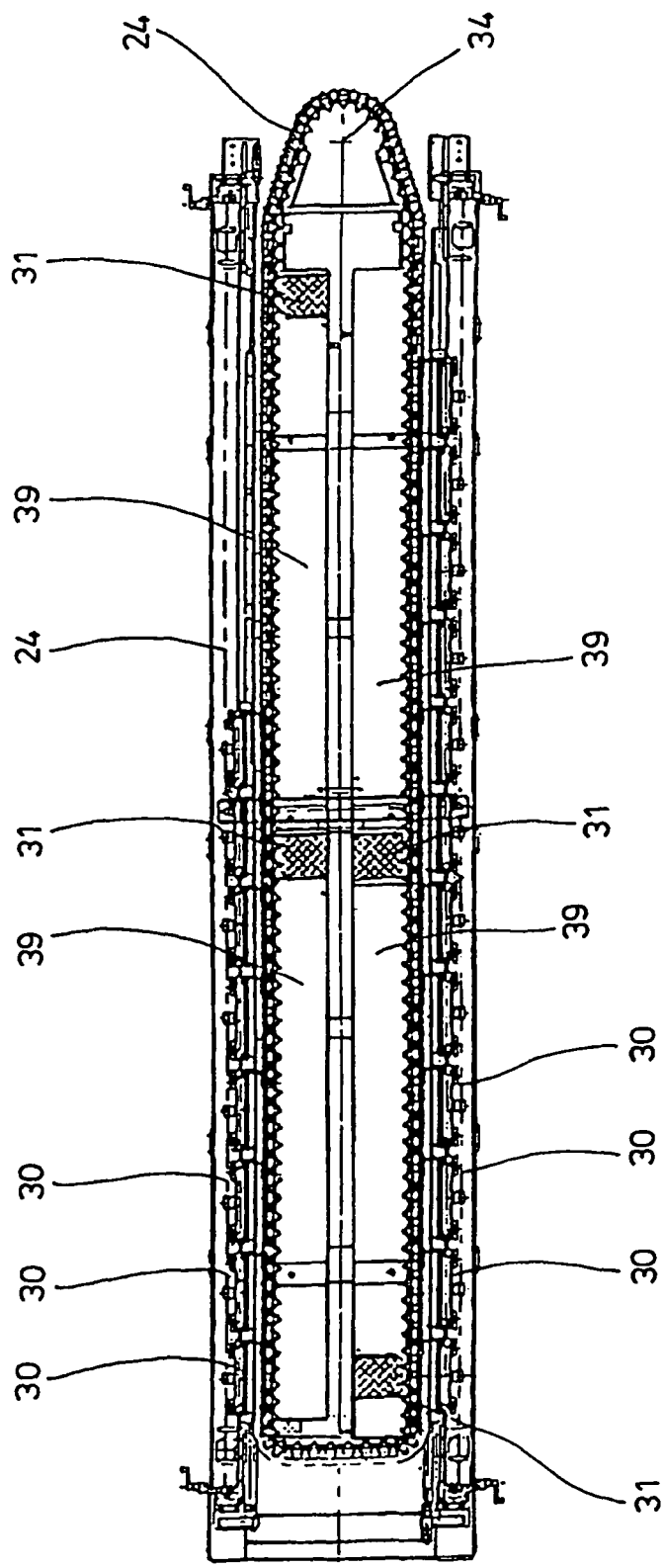
FIG. 4 is a modified heating section with increased heating capacity.

In the modified heating section 24 illustrated in FIG. 4, the larger quantity of heating elements 30 makes it possible to adjust the temperature of the preforms 1 per unit of time because of the larger numbers of heating elements 30. The blowers 31 conduct cooling air into the area of cooling air ducts 39 which are respectively located opposite the corresponding heating elements 30 and which discharge the cooling air through discharge openings. Because of the arrangement of the discharge devices, a flow direction of the cooling air essentially transversely of a transport direction of the preform 1 is realized. The cooling air ducts 39 can make available reflectors for heating radiation in the area opposite the heating elements 30; it is also possible to realize cooling of the heating elements 30 through the discharged cooling air.

Figure 5:
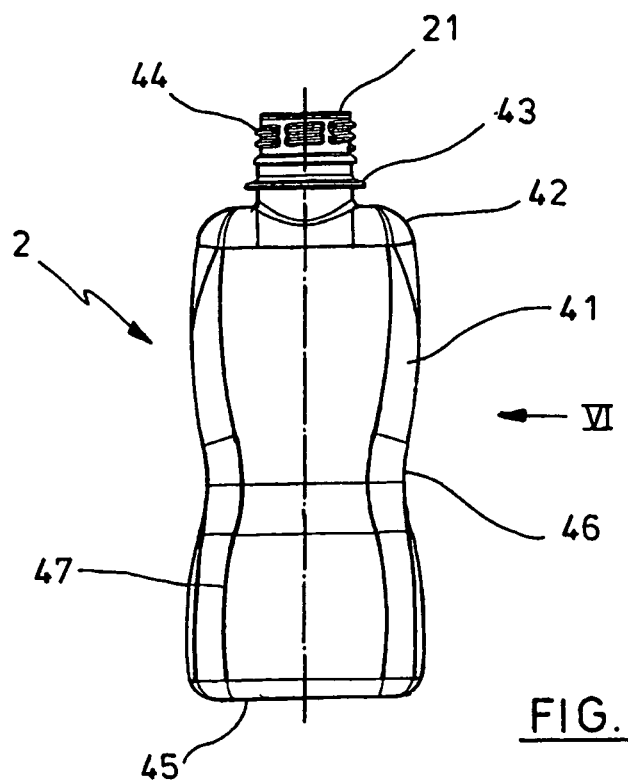
FIG. 5 is a side view of pouch manufactured by blow technology.

FIG. 5 shows a side view of a container 2 constructed as a pouch. The container 2 is provided with a side wall 41 and a shoulder area 42 extending from the side wall 41 into the opening section 21. The opening section 21 has a support ring facing the shoulder area 42, and a thread 44 which typically is constructed as an external thread, and is provided for securing a closing cap. Moreover, the container 2 has a closed bottom 45 arranged opposite the opening section 21.

In accordance with the embodiment of FIG. 5, the side wall 41 has a decreased thickness portion 46 and a surface contour 47 in the area of the side wall 41, which in combination with the contour of the bottom 45, provides the pouch with self-standing properties.

Figure 6:
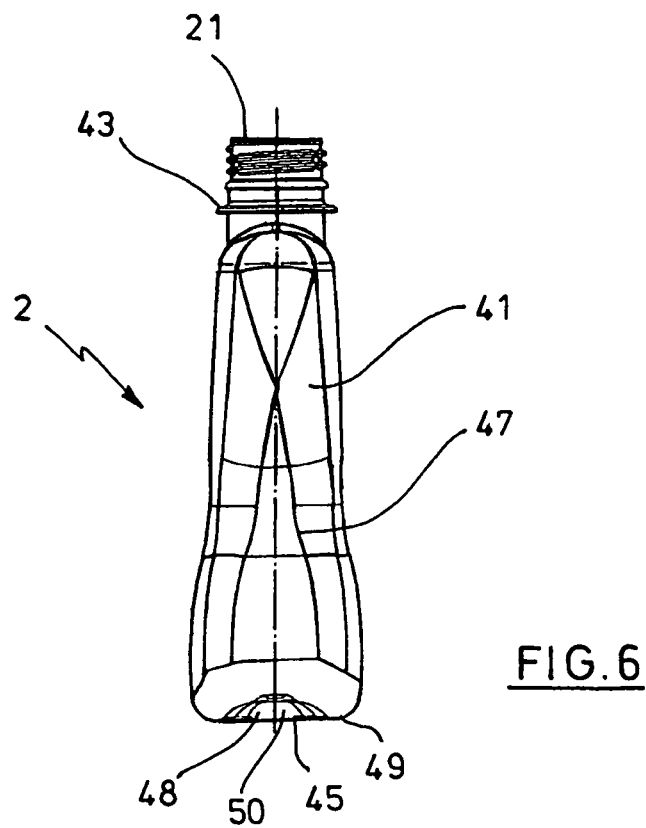
FIG. 6 is a side view of the pouch seen in the direction of arrow VI in FIG. 5.

From the side view according to FIG. 6 intersected at the area of the bottom 45, it can be seen that the bottom 45 has an internal arched portion 48 which is surrounded by a standing ring 49. The internal arch 48 is stabilized by a plurality of contour elements 50.

The side wall 41 typically has a wall thickness of at most 0.2 mm, preferably at most 0.15 mm. A volume of the container 2 constructed as a pouch is preferably at most 1 liter, particularly at most 0.75 liters and especially preferred at most 0.5 liter.

The weight of the container 2 has been found to be advantageous at most 15 grams. Preferably the weight is at most 13 grams and particularly preferred at most 11 grams.

For manufacturing the container 2 constructed as a pouch, a preform 1 is used which in the area of its cylindrical side wall has a wall thickness of at most 2.5 mm, preferably at most 2.4 mm, and particularly preferred at most 2.3 mm.

With respect to the method-technological deformation of the preform 1 into the container 2, an advantageous blowing pressure is at most 20 bars, preferably at most 17.5 bars and especially preferred at most 15 bars. In particular, it is possible not to make available different supply pressures during the blow-technological deformation of the preform 1 into the container 2 and to realize the blow molding process on the basis of only one supply pressure. Thus, the blow deformation is preferably realized without the use of a preblowing pressure.

Because of the thin wall thickness of the container 2 constructed as a pouch, the container bulges out whether it is being filled with the intended filling substance. However, this bulging reinforces a lateral deformation of the filled container 2. A combination of the wall thickness of the container 2 with the surface structure 47 of the side wall 41 is typically selected in such a way that the bulging of the container resulting from the filling process which is considered advantageous is dimensioned in such a way that the volume increase due to the bulging is at least 10% of the volume of the unfilled container.

The container 2 according to FIG. 5 and FIG. 6 has in a horizontal cross-sectional plane an essentially oval basic contour. In this connection, FIG. 5 shows a side view of the wider side and FIG. 6 shows a side view of the narrower side. The surface structure 47 illustrated in FIG. 6 reinforces a high stability of the container 2 as well as a deformability when the containers 2 are stacked, so that the containers are stacked with the side surfaces to be seen in FIG. 5 such that the side surfaces are stacked horizontally one on top of the other.

Figure 7:
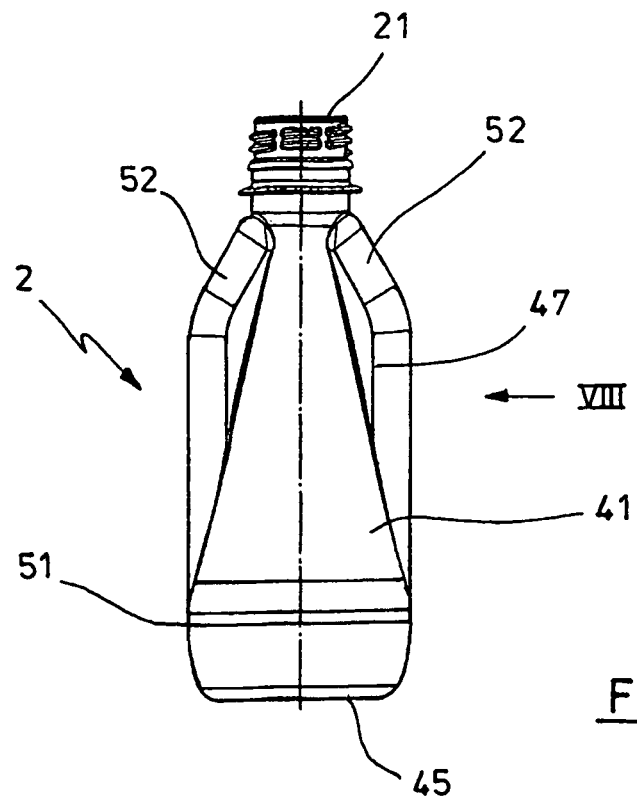
FIG. 7 is a side view of another pouch.
Figure 8:
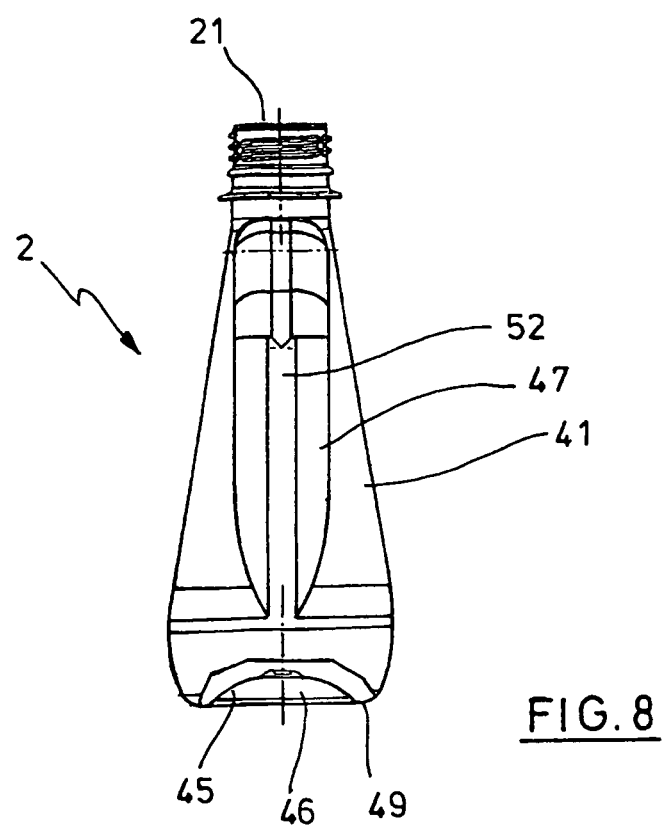
FIG. 8 is a side view of the pouch of FIG. 7 seen in the direction of arrow VIII.

FIG. 7 and FIG. 8 show side views of another embodiment of a container 2 constructed as a pouch. This container 2 has in a horizontal cross-sectional plane an essentially round basic contour which, as seen in FIG. 7 decreases downwardly in the plane of the drawing from the bottom toward the top. This increase in size can be seen in FIG. 8. Moreover, in accordance with the illustration of FIG. 7, the side wall 41 is provided with starting from the opening section 21 wing-like side parts 52 which extend from a foundation area 51 in the direction toward the opening section 21, wherein the side parts 52 stabilize in a laterally acting force load and permit a deformability of the container 2 acting in the direction toward the plane of the drawing.

The invention claimed is:

1. Method of manufacturing a pouch which has a closable opening section, a side wall as well as a closed bottom, wherein an injection-molded preform 1 is adjusted with respect to temperature and is deformed by blowing process in such a way into a container 2 that the material in the area of the side wall 41 is oriented biaxially and is formed with an average wall thickness of at most 0.2 mm so that the side wall is flexible to adapt to changes in contour of the product in the pouch, and the closed bottom 45 is provided with a contour which is such that the pouch has self-standing properties, wherein the pouch in an unfilled state defines an initial inner volume, wherein the wall thickness of the pouch permits the side wall to flex during a filling process so that the inner volume of the pouch increases at least 10% in relation to the initial volume of the pouch.

2. Method according to claim 1, wherein the pouch is formed with an average wall thickness of at most 015 mm.

3. Method according to claim 1, wherein the pouch is formed with a volume of at most 1 liter.

4. Method according to claim 1, wherein the pouch is shaped with a weight of at most 15 grams.

5. Method according to claim 1, wherein a preform 1 with a wall thickness of at most 2.5 mm is deformed blow-technologically into the container 2.

6. Method according to claim 1, wherein the pouch is manufactured with a blowing pressure of at most 20 bars.

7. Method according to claim 1, wherein the blow process is carried out with a use of: a single supply pressure.

8. Method according to claim 1, wherein the bottom 45 of the pouch is deformed with an internal curvature.

9. Method according to claim 1, wherein the bottom 45 of the pouch is deformed with a standing ring.

10. Method according to claim 9, wherein the bottom 45 is formed of a plurality of contour elements 50 extending from the standing ring 49 in the direction toward a bottom center.

11. Method according to claim 1, wherein the pouch is deformed with an oval basic contour extending with a horizontal sectional plane.

12. Method according to claim 1, wherein the pouch is shaped in the area of the side wall 41 with a surface structure 47 for stabilization.

* * * * *